(12) United States Patent
Shirai

(10) Patent No.: US 9,481,425 B2
(45) Date of Patent: Nov. 1, 2016

(54) BICYCLE SUSPENSION

(71) Applicant: SHIMANO INC., Sakai (JP)

(72) Inventor: Toyoto Shirai, Sakai (JP)

(73) Assignee: SHIMANO INC., Sakai (JP)

( * ) Notice: Subject to any disclaimer, the term of this patent is extended or adjusted under 35 U.S.C. 154(b) by 144 days.

(21) Appl. No.: 14/083,326

(22) Filed: Nov. 18, 2013

(65) Prior Publication Data

US 2015/0137478 A1     May 21, 2015

(51) Int. Cl.
    *B62K 25/08*         (2006.01)

(52) U.S. Cl.
    CPC ..................... *B62K 25/08* (2013.01)

(58) Field of Classification Search
    CPC    B62K 21/02; B62K 25/08; B62K 2025/045; F16F 9/02; F16F 9/0263; F16F 9/0245
    USPC ........... 280/276, 275, 283; 267/64.11, 64.12, 267/64.15, 64.16, 64.25, 124, 129
    See application file for complete search history.

(56) References Cited

U.S. PATENT DOCUMENTS

| | | | |
|---|---|---|---|
| 6,095,541 A | 8/2000 | Turner et al. | |
| 6,105,988 A | 8/2000 | Turner et al. | |
| 8,251,376 B2 | 8/2012 | Mouri et al. | |
| 8,317,171 B2 * | 11/2012 | Inoue | 267/218 |
| 8,596,663 B2 * | 12/2013 | Shirai | 280/276 |
| 8,641,052 B2 * | 2/2014 | Kondo et al. | 280/5.514 |
| 2004/0262879 A1 * | 12/2004 | Kinzler et al. | 280/276 |
| 2006/0028058 A1 * | 2/2006 | Jung | 297/76 |
| 2009/0255768 A1 * | 10/2009 | Inoue | B62K 25/08 188/313 |
| 2011/0062679 A1 * | 3/2011 | Shirai | 280/276 |
| 2011/0215550 A1 * | 9/2011 | Shirai | 280/276 |

FOREIGN PATENT DOCUMENTS

| | | | |
|---|---|---|---|
| DE | 102011102070 | * | 11/2012 |
| JP | 2012-215189 | | 11/2012 |

* cited by examiner

*Primary Examiner* — Anne Marie Boehler
(74) *Attorney, Agent, or Firm* — Mori & Ward, LLP

(57) ABSTRACT

A bicycle suspension comprises a cylinder element, a piston element, and a stroke adjustment structure. The cylinder element includes an internal space extending in an axial direction of the cylinder element. The piston element is provided in the internal space to define a first air chamber and a second air chamber in the cylinder element. The second air chamber is opposite to the first air chamber with respect to the piston element. The stroke adjustment structure is configured to adjust a stroke of the bicycle suspension and includes an axially movable member configured to initiate a stroke adjustment of the bicycle suspension. The axially movable member is configured to be entirely disposed in the first air chamber.

22 Claims, 14 Drawing Sheets

BICYCLE SUSPENSION

BACKGROUND OF THE INVENTION

1. Field of the Invention

The present invention relates to a bicycle suspension.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been recently redesigned is a bicycle suspension.

In the bicycle suspension, it is sometimes desirable to be able to adjust the suspension stroke as needed and/or desired. Thus, there have been proposals to provide suspensions configured to adjust the suspension stroke.

SUMMARY OF THE INVENTION

In accordance with a first aspect of the present invention, a bicycle suspension comprises a cylinder element, a piston element, and a stroke adjustment structure. The cylinder element includes an internal space extending in an axial direction of the cylinder element. The piston element is provided in the internal space to define a first air chamber and a second air chamber in the cylinder element. The second air chamber is opposite to the first air chamber with respect to the piston element. The stroke adjustment structure is configured to adjust a stroke of the bicycle suspension and includes an axially movable member configured to initiate a stroke adjustment of the bicycle suspension. The axially movable member is configured to be entirely disposed in the first air chamber.

In accordance with a second aspect of the present invention, the bicycle suspension according to the first aspect is configured so that the stroke adjustment structure further includes an actuator configured to operate the axially movable member. The actuator includes a housing having an inside space.

In accordance with a third aspect of the present invention, the bicycle suspension according to the second aspect is configured so that the housing is configured to be at least partly disposed in the first air chamber.

In accordance with a fourth aspect of the present invention, the bicycle suspension according to the second aspect is configured so that the inside space of the housing is configured to be in fluid communication with the first air chamber in an airtight state with respect to an outside of the first air chamber and the housing.

In accordance with a fifth aspect of the present invention, the bicycle suspension according to the second aspect is configured so that the housing is configured to be entirely disposed in the first air chamber.

In accordance with a sixth aspect of the present invention, the bicycle suspension according to the first aspect is configured so that the first air chamber defines a positive air chamber of the bicycle suspension. The second air chamber defines a negative air chamber of the bicycle suspension.

In accordance with a seventh aspect of the present invention, the bicycle suspension according to the second aspect is configured so that the inside space of the housing is configured to be in fluid communication with the first air chamber to define a positive air chamber of the bicycle suspension together with the first air chamber.

In accordance with an eighth aspect of the present invention, the bicycle suspension according to the second aspect is configured so that the actuator includes an output portion rotatable with respect to a rotational axis that is parallel to the axial direction. The axially movable member is connected to the output portion. The output portion is configured to be at least partly disposed in the first air chamber.

In accordance with a ninth aspect of the present invention, the bicycle suspension according to the eighth aspect is configured so that the output portion is configured to be entirely disposed in the first air chamber.

In accordance with a tenth aspect of the present invention, the bicycle suspension according to the second aspect is configured so that an outer peripheral surface of the housing is spaced apart from an inner peripheral surface of the cylinder element in a radial direction perpendicular to the axial direction.

In accordance with an eleventh aspect of the present invention, the bicycle suspension according to the second aspect is configured so that the actuator comprises a motor.

In accordance with a twelfth aspect of the present invention, the bicycle suspension according to the eleventh aspect is configured so that the motor includes a stator configured to be secured to the housing and including a coil, and a rotor configured to be rotatable relative to the stator and including a magnet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
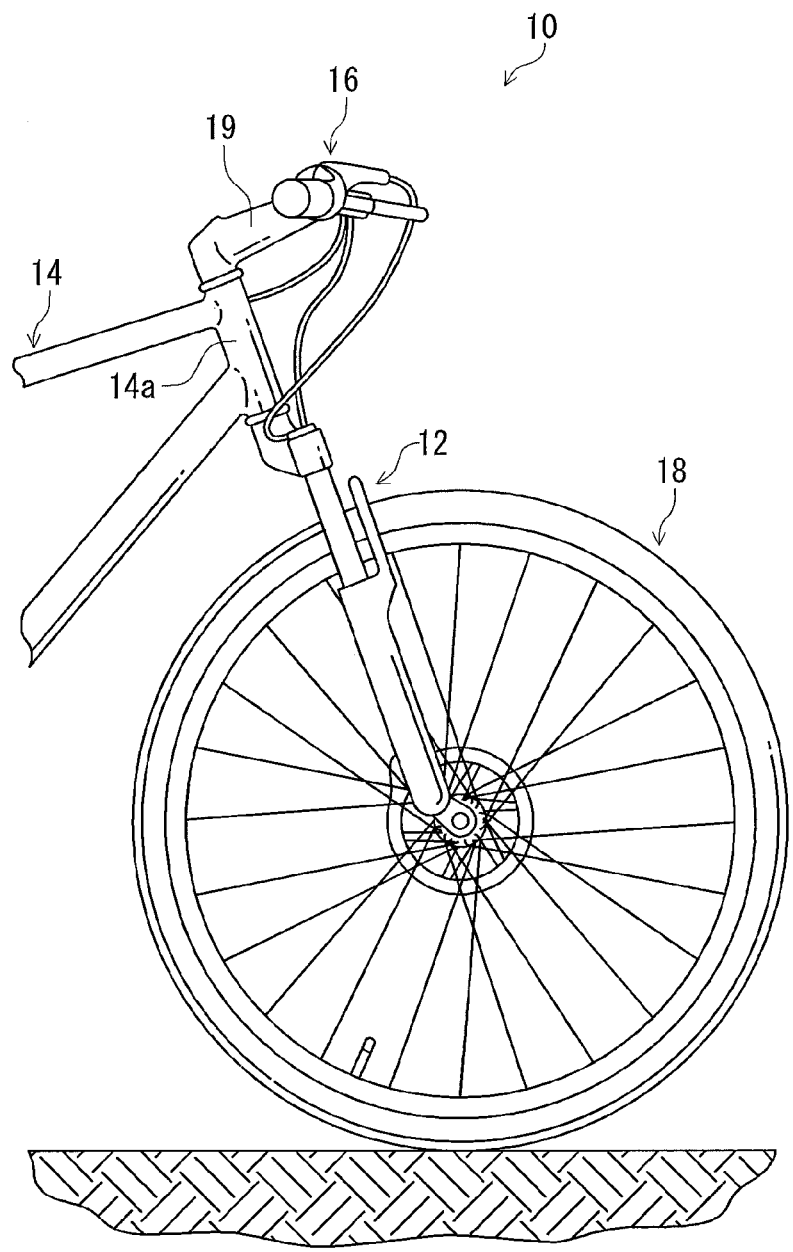
FIG. 1 is a schematic elevation side view of a portion of a bicycle equipped with a bicycle suspension in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 is illustrated that is equipped with a bicycle suspension 12 in accordance with one embodiment. The bicycle 10 further includes a bicycle frame 14, a handlebar 16, and a front wheel 18. In the illustrated embodiment, the bicycle suspension 12 is incorporated into (or otherwise define) a front-fork of the bicycle 10. However, the bicycle suspension 12 may be alternatively (or additionally) utilized as or part of a rear suspension assembly and, thereby, may include other components corresponding to these other suspension assembly configurations.

In the present application, the following directional terms "front", "rear", "forward", "rearward", "left", "right", "transverse", "upward" and "downward" as well as any other similar directional terms refer to those directions which are determined on the basis of the rider who sits on a saddle (now shown) of the bicycle 10 with facing the handlebar 16, for example. Accordingly, these terms, as utilized to describe the bicycle suspension 12, should be interpreted relative to the bicycle 10 as used in an upright riding position on a horizontal surface.

An upper end of the bicycle suspension 12 is rotatably mounted to a head tube 14a of the bicycle frame 14. The handlebar 16 is secured to the upper end of the bicycle suspension 12 via a stem 19. A lower end of the bicycle suspension 12 rotatably supports the front wheel 18. The rest of the bicycle 10 can be any type of bicycle, and thus, the bicycle 10 will not be discussed or illustrated in further detail herein for the sake of brevity.

Figure 2:
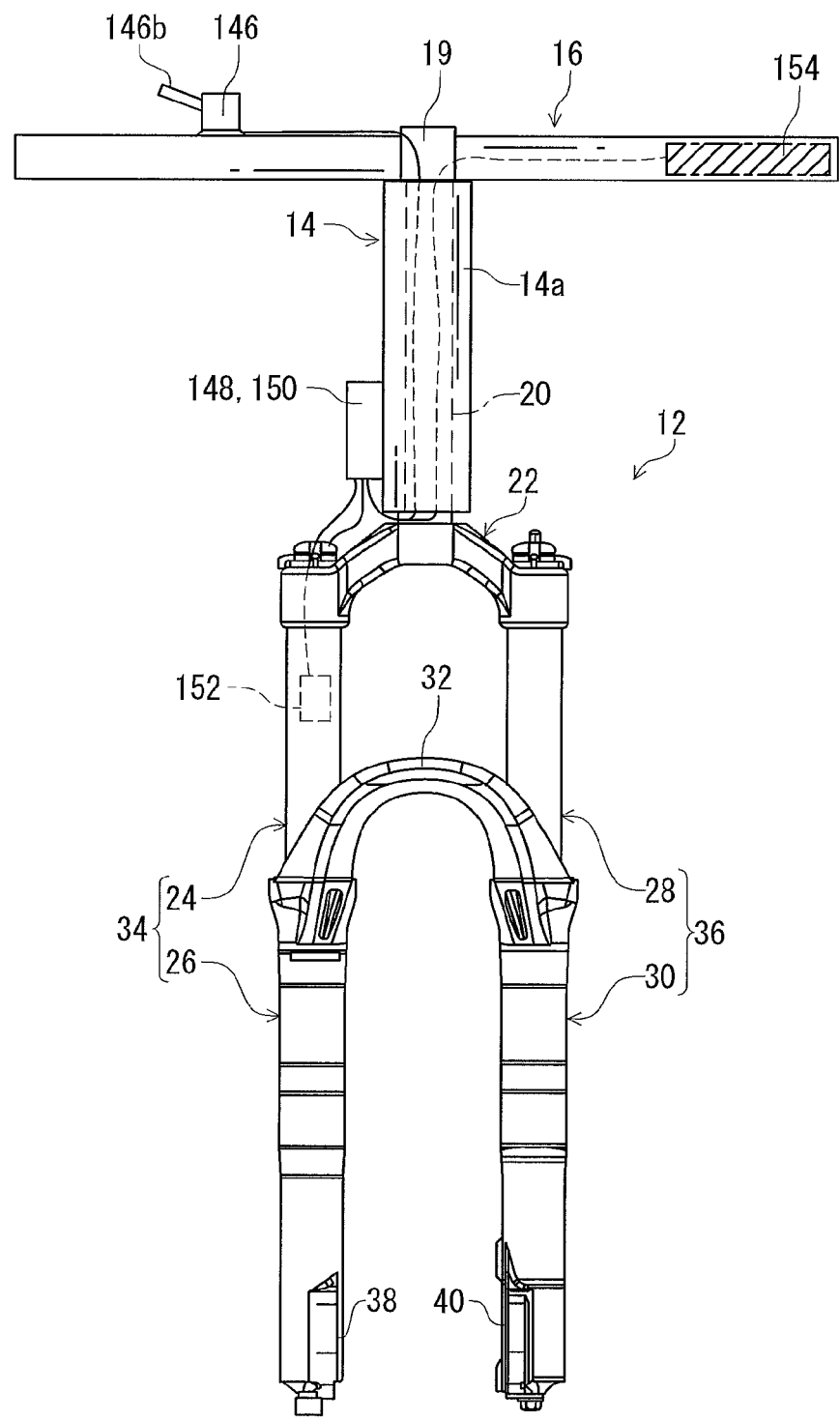
FIG. 2 is a schematic elevation front view of a portion of the bicycle illustrated in FIG. 1.

As seen in FIG. 2, the bicycle suspension 12 comprises a steerer tube 20 and an upper connecting member 22. The steerer tube 20 is rotatably mounted to the head tube 14a of the bicycle frame 14. Au upper end of the steerer tube 20 is coupled to the handlebar 16 via the stem 19. A lower end of the steerer tube 20 is secured to the upper connecting member 22.

The bicycle suspension 12 further comprises a first upper cylinder (or a cylinder element) 24, a first lower cylinder 26, a second upper cylinder 28, a second lower cylinder 30, and a lower connecting member 32. An upper end of the first upper cylinder 24 is secured to the upper connecting member 22. An upper end of the second upper cylinder 28 is secured to the upper connecting member 22. The first lower cylinder 26 includes a first supporting portion 38. The second lower cylinder 30 includes a second supporting portion 40. The first supporting portion 38 and the second supporting portion 40 rotatably support the front wheel 18 (FIG. 1). The lower connecting member 32 connects the first lower cylinder 26 and the second lower cylinder 30 to provide strength and minimize twisting thereof. In the illustrated embodiment, the first lower cylinder 26, the second lower cylinder 30 and the lower connecting member 32 are formed as a single unitary member.

The first upper cylinder 24 is telescopically received in the first lower cylinder 26. The first upper cylinder 24 and the first lower cylinder 26 constitute a part of a first shock absorber 34 configured to expand and contract for absorbing shocks while riding the bicycle 10 over rough terrain. The first shock absorber 34 is configured to provide resistance to compression of the bicycle suspension 12 and configured to release stored energy during compression to cause the bicycle suspension 12 to expand (or rebound).

The second upper cylinder 28 is telescopically received in the second lower cylinder 30. The second upper cylinder 28 and the second lower cylinder 30 constitute a part of a second shock absorber 36 configured to expand and contract for absorbing shocks while riding the bicycle 10 over rough terrain. The second shock absorber 36 is configured to provide damping force which resists both compression and rebound of the bicycle suspension 12 and, thereby, configured to regulate rate of compression and rebound of the bicycle suspension 12.

Figure 3:
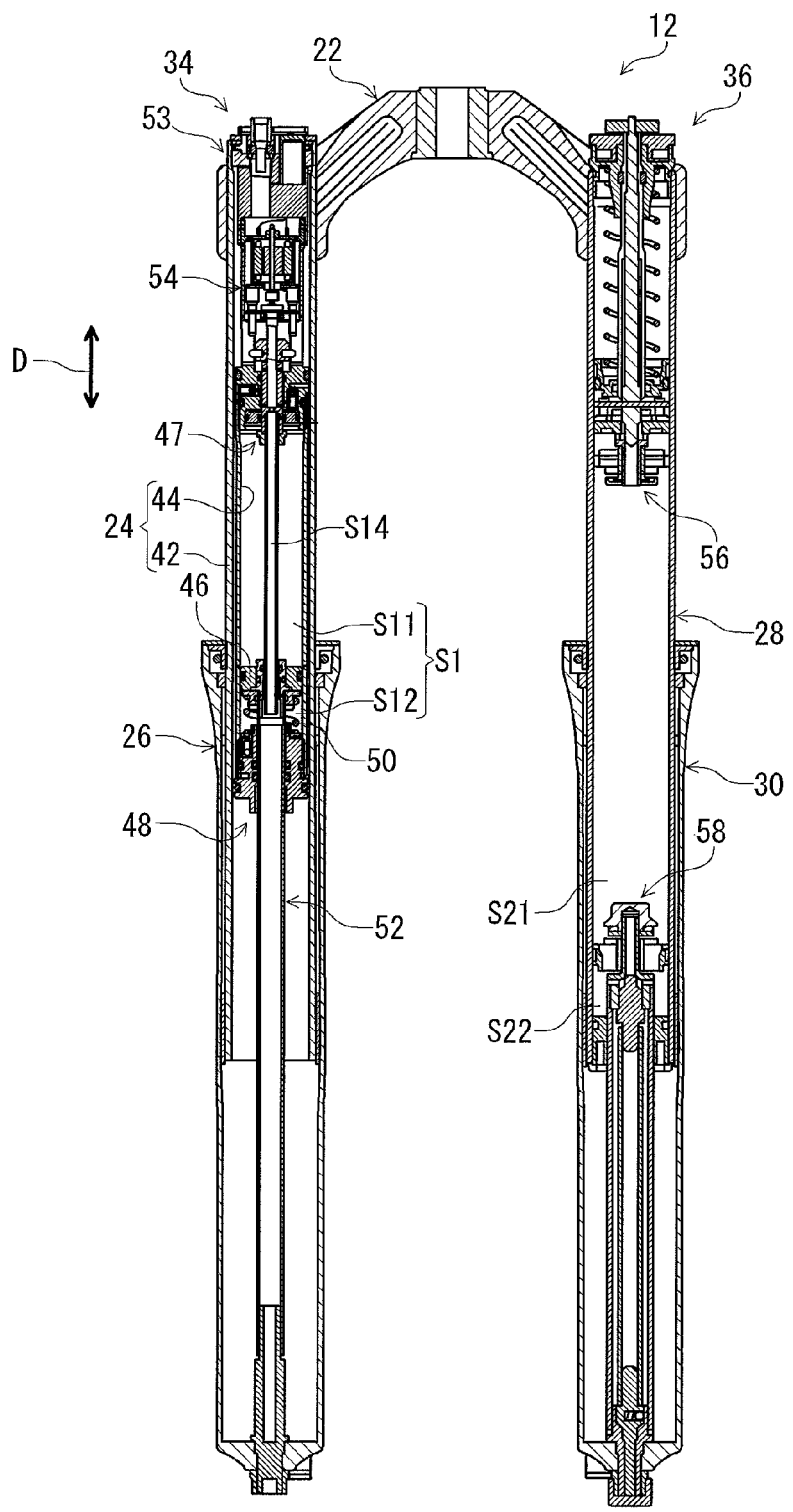
FIG. 3 is a longitudinal cross-sectional view of the bicycle suspension illustrated in FIG. 1.

As seen in FIG. 3, the first upper cylinder (or the cylinder element) 24 of the first shock absorber 34 includes an internal space S1 extending in an axial direction D of the first upper cylinder 24. More specifically, the first upper cylinder 24 includes an outer tube member 42 and an inner tube member 44. The outer tube member 42 and the inner tube member 44 extend in the axial direction D. The inner tube member 44 is provided in the outer tube member 42. The internal space S1 is defined in the outer tube member 42 and the inner tube member 44.

The bicycle suspension 12 further comprises a piston (or a piston element) 46 and a stroke adjustment structure 54. In addition, the bicycle suspension 12 may comprise an upper sealing structure 47, a lower sealing structure 48, a coil spring 50, a lower tube part 52, and a cover member 53. The piston (or the piston element) 46 is provided in the internal space S1 to define a first air chamber S11 and a second air chamber S12 in the first upper cylinder (or the cylinder element) 24. The second air chamber S12 is opposite to the first air chamber S11 with respect to the piston (or the piston element) 46. The first air chamber S11 defines a positive air chamber of the bicycle suspension 12. The second air chamber S12 defines a negative air chamber of the bicycle suspension 12.

The piston 46 is provided in the inner tube member 44 of the first upper cylinder 24. The piston 46 is relatively slidable with respect to an inner peripheral surface of the inner tube member 44 in the axial direction D. The upper sealing structure 47 is secured to an upper end of the inner tube member 44. A part of the first air chamber S11 is defined by the inner tube member 44, the piston 46 and the upper sealing structure 47. The lower sealing structure 48 is secured to a lower end of the inner tube member 44. The second air chamber S12 is defined by the inner tube member 44, the piston 46 and the lower sealing structure 48.

The coil spring 50 is provided between the piston 46 and the lower sealing structure 48 in the second air chamber S12. The coil spring 50 is compressed between the piston 46 and the lower sealing structure 48 in an initial state where weight of the bicycle frame 14 or other bicycle components is applied to the bicycle suspension 12.

The lower tube part 52 extends in the axial direction D and connects the piston 46 to the first lower cylinder 26. More specifically, an upper end of the lower tube part 52 is secured to the piston 46. A lower end of the lower tube part 52 is secured to the first lower cylinder 26. The lower tube part 52 is relatively slidable with respect to the lower sealing structure 48. The piston 46, the lower tube part 52 and the first lower cylinder 26 are movable relative to the first upper cylinder 24 and the lower sealing structure 48 in the axial direction D.

Figure 4:
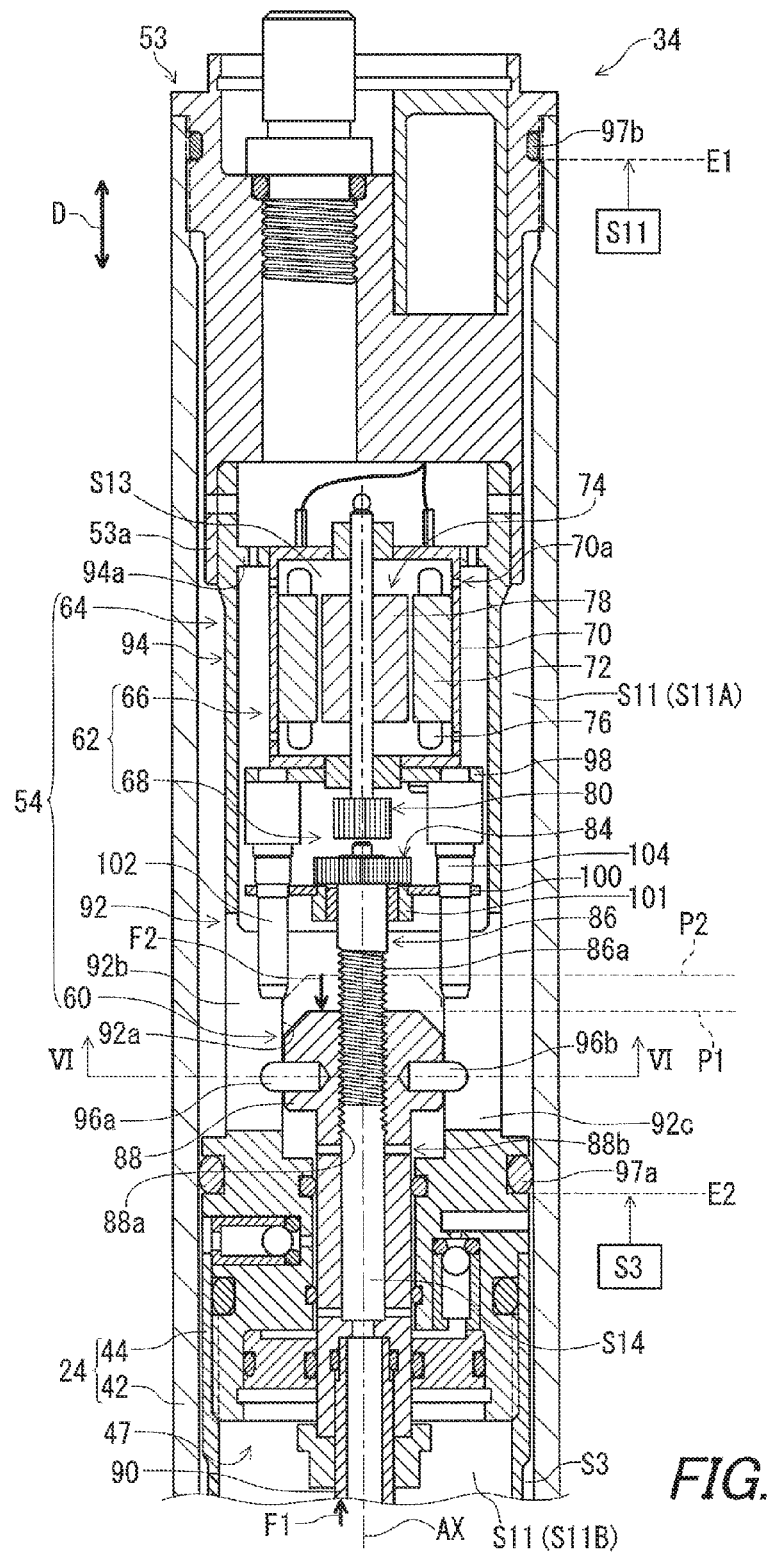
FIG. 4 is a partial cross-sectional view of the bicycle suspension taken along IV-IV line of FIG. 6.
Figure 7:
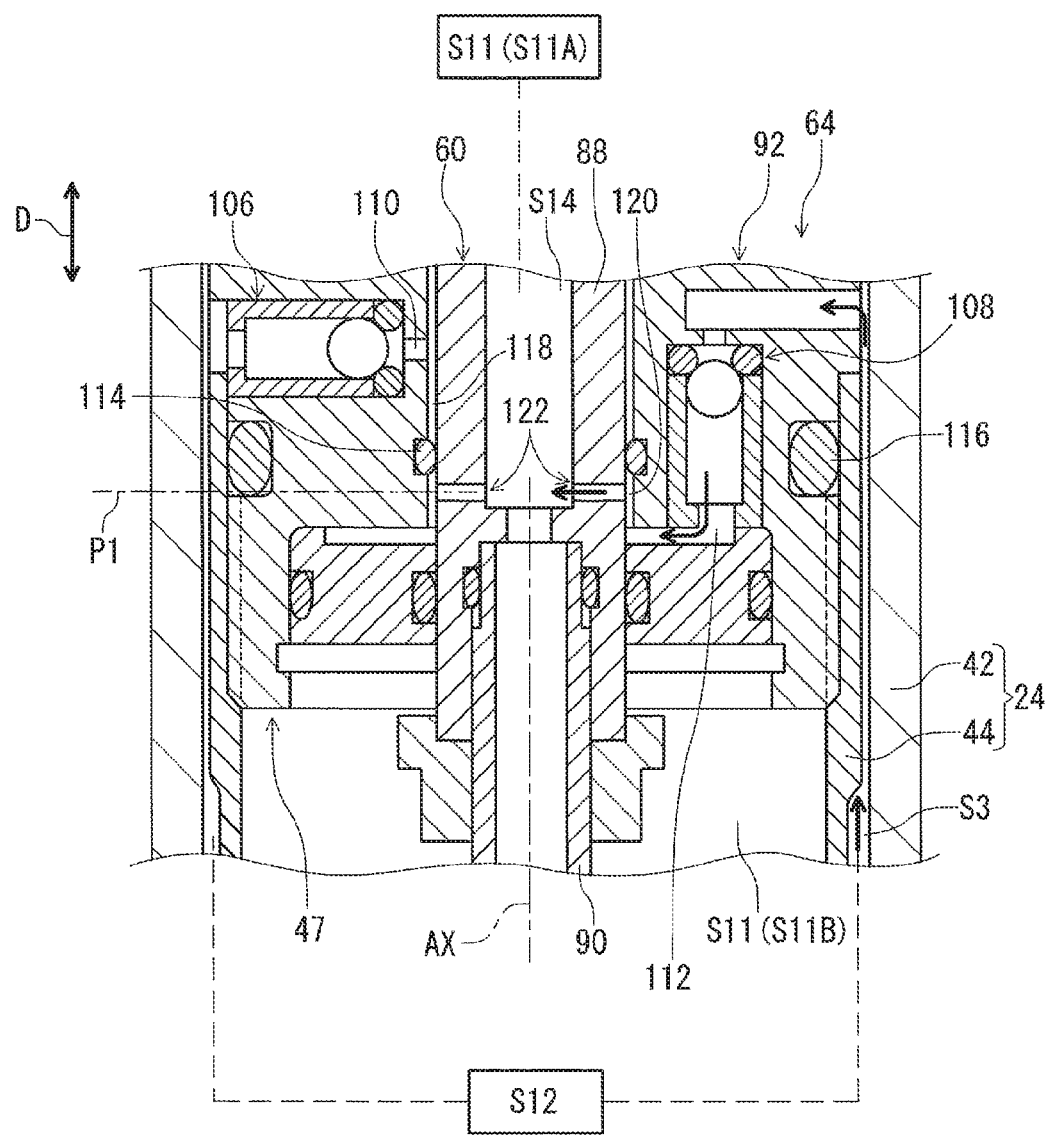
FIG. 7 is a partial cross-sectional view of the bicycle suspension illustrated in FIG. 1 (long-stroke position)
Figure 8:
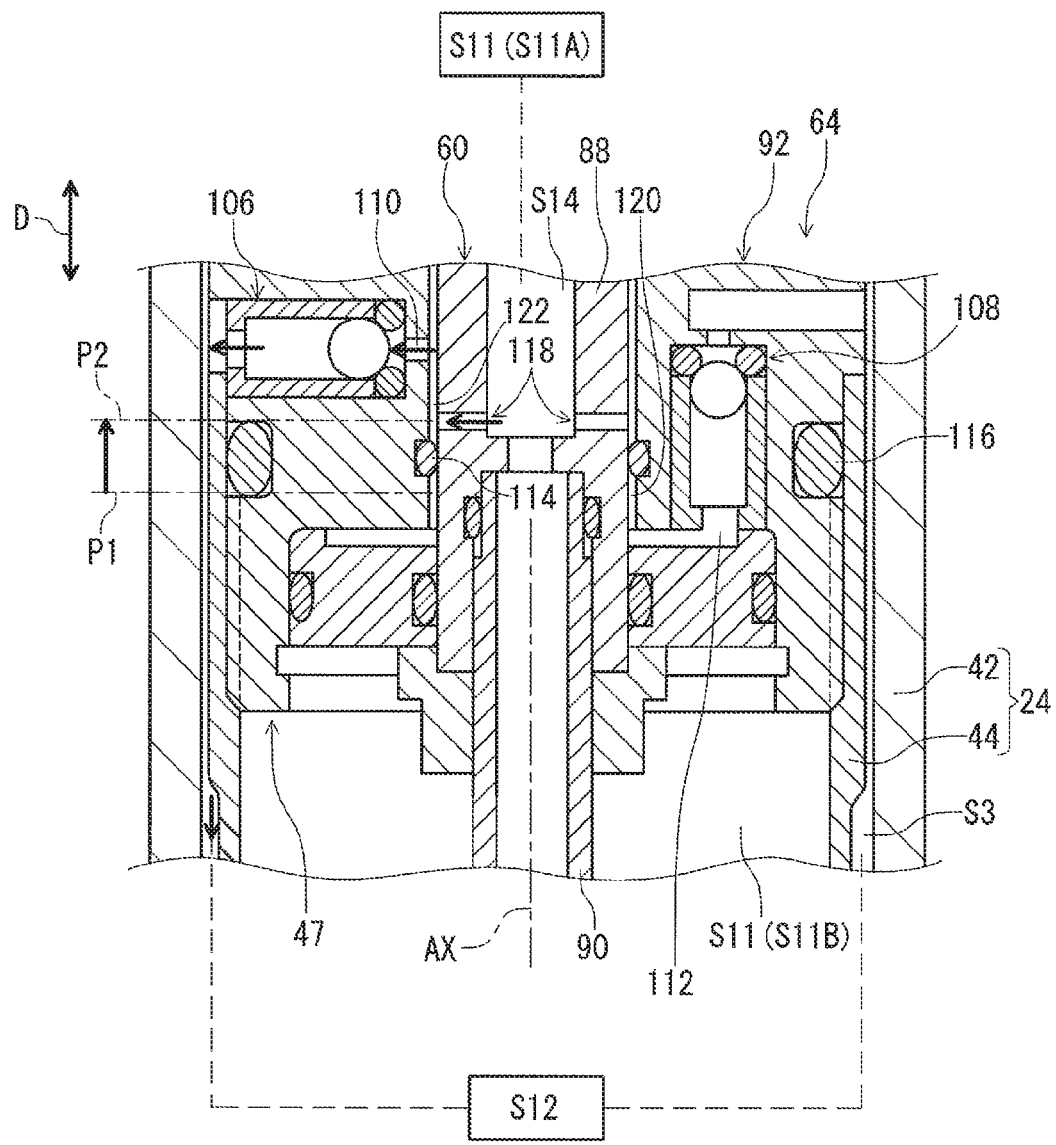
FIG. 8 is a partial cross-sectional view of the bicycle suspension illustrated in FIG. 1 (short-stroke position)

As seen in FIG. 3, the cover member 53 is secured to the upper end of the first upper cylinder 24. More specifically, the cover member 53 is secured to an upper end of the outer tube member 42. The first air chamber S11 is defined between the piston 46 and the cover member 53 in the first upper cylinder 24. A part of the first air chamber S11 is defined between the piston 46 and the upper sealing structure 47 in the inner tube member 44. The upper sealing structure 47 divides the first air chamber S11 into a first sub chamber S11A (FIGS. 4, 7, and 8) and a second sub chamber S11B (FIGS. 4, 7, and 8). A part of the first air chamber S11 is defined between the cover member 53 and the upper sealing structure 47 in the outer tube member 42.

The stroke adjustment structure 54 is configured to adjust a stroke of the bicycle suspension 12. The stroke adjustment structure 54 is provided in the first air chamber S11. More specifically, the stroke adjustment structure 54 is provided between the cover member 53 and the upper sealing structure 47 in the first upper cylinder 24. The stroke adjustment structure 54 is provided inside the outer tube member 42 of the first upper cylinder 24. The stroke adjustment structure 54 will be described in detail later.

The second shock absorber 36 of the bicycle suspension 12 includes an upper adjustable dampening assembly 56 and a lower adjustable dampening assembly 58. The upper adjustable dampening assembly 56 is provided in the second upper cylinder 28. The lower adjustable dampening assembly 58 is provided in the second upper cylinder 28 and the second lower cylinder 30. The second shock absorber 36 further includes a first fluid chamber S21 and a second fluid chamber S22 which are filled with fluid such as oil. The upper adjustable dampening assembly 56 and the lower adjustable dampening assembly 58 are configured to change the damping force which resists both compression and rebound of the bicycle suspension 12. Since the structures of the second shock absorber 36 has been known, they will not be described in detail here for the sake of brevity.

As seen in FIG. 4, the stroke adjustment structure 54 of the first shock absorber 34 includes an axially movable member 60. The stroke adjustment structure 54 of the first shock absorber 34 further includes an actuator 62. In addition, the stroke adjustment structure 54 of the first shock absorber 34 may include a support member 64. The axially movable member 60 is configured to initiate a stroke adjustment of the bicycle suspension 12. The actuator 62 is configured to operate the axially movable member 60. The axially movable member 60 is movable between a long-stroke position P1 and a short-stroke position P2 relative to the first upper cylinder 24. The actuator 62 is provided in the support member 64. The actuator 62 is configured to move the axially movable member 60 between the long-stroke position P1 and the short-stroke position P2 relative to the first upper cylinder 24. The actuator 62 comprises a motor 66, and may further comprise a transmitting structure 68.

The motor 66 is configured to generate a driving force to operate the axially movable member 60. The actuator 62, i.e. the motor 66, includes a housing 70. The motor 66 includes a stator 72, and a rotor 74. The housing 70 is configured to be at least partly disposed in the first air chamber S11. In the illustrated embodiment, the motor 66 is a stepping motor, for example. The motor 66 can be, however, other actuators such as a direct current motor or a solenoid valve.

The actuator 62 is preferably configured to be entirely disposed in the first air chamber S11. More specifically, the housing 70 is configured to be entirely disposed in the first air chamber S11. The housing 70 has an inside space S13. The inside space S13 of the housing 70 is configured to be in fluid communication with the first air chamber S11 in an airtight state with respect to an outside of the first air chamber S11 and the housing 70. The inside space S13 is configured to be in fluid communication with the first air chamber S11 to define a positive air chamber of the bicycle suspension 12 together with the first air chamber S11. The housing 70 includes a communication passage 70a via which the inside space S13 is in fluid communication with the first air chamber S11. Accordingly, it is possible to effectively obtain necessary volume of such a positive air chamber since the inside space S13 of the actuator 62 is in fluid communication with the first air chamber S11.

The stator 72 is provided in the housing 70. The stator 72 is configured to be secured to the housing 70 and includes a coil 76. The rotor 74 is configured to be rotatable relative to the stator 72 about a rotational axis AX and includes a magnet 78.

Figure 5:
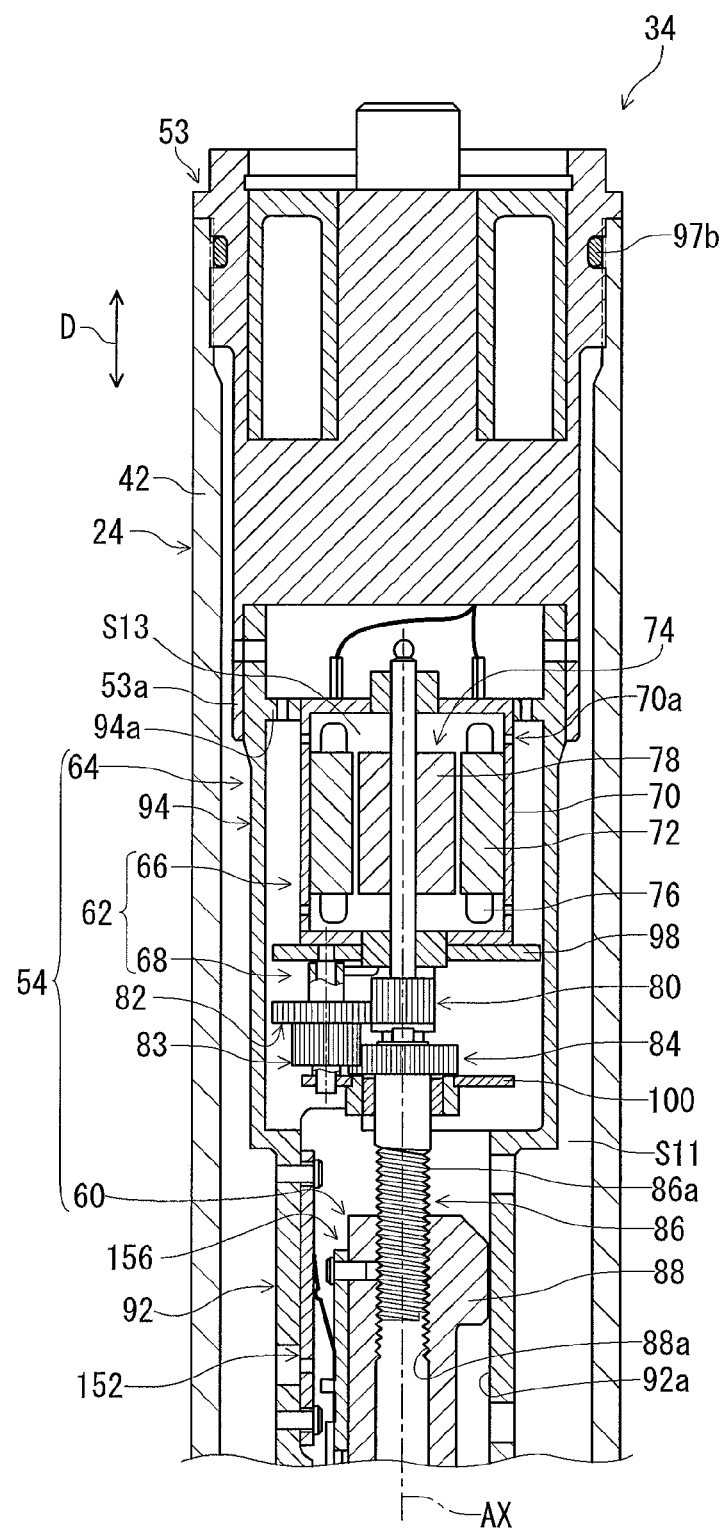
FIG. 5 is a partial cross-sectional view of the bicycle suspension taken along V-V line of FIG. 6.

As seen in FIGS. 4 and 5, the actuator 62 is provided in the outer tube member 42 of the first upper cylinder 24. The support member 64 is configured to be entirely provided in the first air chamber S11. An outer peripheral surface of the housing 70 is spaced apart from an inner peripheral surface of the first upper cylinder (or the cylinder element) 24 in a radial direction perpendicular to the axial direction D. More specifically, an outer peripheral surface of the support member 64 is spaced apart from an inner peripheral surface of the outer tube member 42 of the first upper cylinder (or the cylinder element) 24 in the radial direction. The outer peripheral surface of the housing 70 of the actuator 62 is spaced apart from an inner peripheral surface of the tube portion 94 of the support member 64 in the radial direction. The tube portion 94 is disposed between the outer tube member 42 and the housing 70 of the actuator 62 in the radial direction.

As seen in FIG. 5, the transmitting structure 68 is configured to transmit the driving force generated by the motor 66 to the axially movable member 60. The actuator 62 includes an output portion 86. More specifically, the transmitting structure 68 of the actuator 62 includes a first gear 80, a second gear 82, a third gear 83, a fourth gear 84, and the output portion 86. The first gear 80 is secured to an end of the rotor 74 and meshes with the second gear 82. The second gear 82 is attached to the third gear 83 to be integrally rotatable relative to the housing 70 of the motor 66. The fourth gear 84 meshes with the third gear 83 and is secured to an end of the output portion 86. The second gear 82 has an outer diameter larger than an outer diameter of the first gear 80. The fourth gear 84 has an outer diameter larger than an outer diameter of the third gear 83. The transmitting structure 68 serves as reduction gears.

Returning to FIG. 4, the output portion 86 is rotatable with respect to the rotational axis AX that is parallel to the axial direction D. The axially movable member 60 is connected to the output portion 86. The output portion 86 is configured to be at least partly disposed in the first air chamber S11. In the illustrated embodiment, the output portion 86 is configured to be entirely disposed in the first air chamber S11. The output portion 86 includes an external thread 86a screwed in the axially movable member 60.

The axially movable member 60 is configured to be entirely disposed in the first air chamber S11. The axially movable member 60 includes a connecting part 88 and an upper tube part 90. The connecting part 88 has a substantially cylindrical shape and extends in the axial direction D. The connecting part 88 includes a threaded hole 88a. The external thread 86a of the output portion 86 is screwed in the threaded hole 88a of the connecting part 88. The external thread 86a and the threaded hole 88a are configured to convert a rotation of the output portion 86 into an axial movement of the axially movable member 60.

A lower end of the connecting part 88 is secured to an upper end of the upper tube part 90. The support member 64 includes a guide portion 92 and a tube portion 94. The guide portion 92 is configured to guide the axially movable member 60 in the axial direction D. The guide portion 92 includes a guide cavity 92a extending in the axial direction D. The connecting part 88 is provided in the guide cavity 92a to slidably contact the guide portion 92. The tube portion 94 has a substantially cylindrical shape and extends from the guide portion 92 in the axial direction D. An upper end of the tube portion 94 is fitted in a cylindrical portion 53a of the cover member 53. The motor 66 is provided in the tube portion 94. The motor 66 is fitted in a flange 94a of the tube portion 94.

As seen in FIG. 4, the axially movable member 60 further includes a first pin 96a and a second pin 96b. The first pin 96a and the second pin 96b are secured to the connecting part 88 to protrude from the connecting part 88 in directions opposite to one another. In the illustrated embodiment, the first pin 96a and the second pin 96b extend from the connecting part 88 in the radial direction perpendicular to the rotational axis AX.

Figure 6:
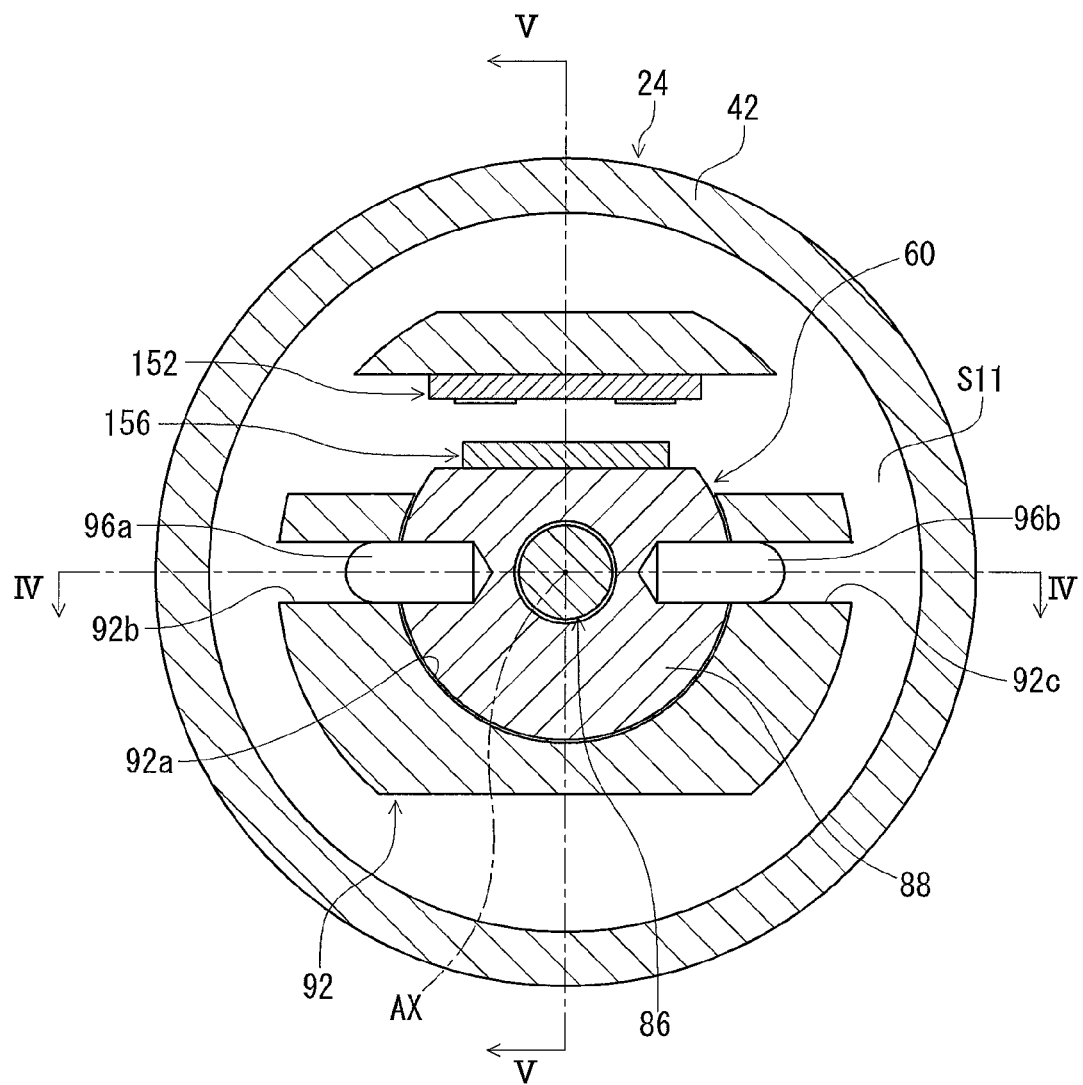
FIG. 6 is a partial cross-sectional view of the bicycle suspension taken along VI-VI line of FIG. 4.

As see in FIGS. 4 and 6, the guide portion 92 includes a first guide groove 92b and a second guide groove 92c. The first pin 96a is provided in the first guide groove 92b. The second pin 96b is provided in the second guide groove 92c. The first guide groove 92b extends in the axial direction D to guide the first pin 96a in the axial direction D. The second guide groove 92c extends in the axial direction D to guide the second pin 96b in the axial direction D. The first guide groove 92b and the second guide groove 92c prevent the axially movable member 60 from rotating relative to the guide portion 92 of the support member 64.

As seen in FIG. 4, an inside space of the support member 64 is in fluid communication with a space defined between the outer tube member 42 and the support member 64 via the first guide groove 92b and the second guide groove 92c. The connecting part 88 includes a communication passage 88b. The inside space of the support member 64 is in fluid communication with an inside passage S14 provided in the axially movable member 60. The first air chamber S11 can be in fluid communication with the inside passage S14 via the communication passage 88b of the connecting part 88. The inside passage S14 is defined in the axially movable member 60 and the lower tube part 52 (FIG. 3).

As seen in FIG. 4, an intermediate passage S3 is defined between the outer tube member 42 and the inner tube member 44. The intermediate passage S3 downward extends in the axial direction D from the upper sealing structure 47. An outer seal ring 97a is provided between the guide portion 92 and the outer tube member 42. The first air chamber S11 and the intermediate passage S3 are sealed therebetween with the outer seal ring 97a.

An upper portion of the first air chamber S11 and the outside of the bicycle suspension 12 are sealed therebetween with an upper seal ring 97b provided between the cover member 53 and the outer tube member 42. An upper end of the first air chamber S11 is defined on a first line E1 illustrated in FIG. 4. An upper end of the intermediate passage S3 is defined on a second line E2 illustrated in FIG. 4. As seen in FIG. 4, the upper end of the first air chamber S11 is disposed above the upper end of the intermediate passage S3.

The actuator 62 further includes a first plate 98, a second plate 100, a bearing portion 101, a first supporting rod 102, and a second supporting rod 104. The first plate 98 is secured to the housing 70 of the motor 66. An upper end of the first supporting rod 102 is attached to the first plate 98. An upper end of the second supporting rod 104 is attached to the first plate 98. A lower end of the first supporting rod 102 is provided in the first guide groove 92b. A lower end of the second supporting rod 104 is provided in the second guide groove 92c. The first supporting rod 102 and the second supporting rod 104 extend through holes provided on the second plate 100. The second plate 100 is supported by the first supporting rod 102 and the second supporting rod 104. The bearing portion 101 is provided on the second plate 100 to rotatably support the output portion 86 of the actuator 62.

As seen in FIG. 7, the upper sealing structure 47 is configured to switch a state of fluid communication between the first air chamber S11 and the second air chamber S12. The upper sealing structure 47 includes a first check valve 106 and a second check valve 108. The first check valve 106 is configured to allow air to flow from the first air chamber S11 to the second air chamber S12 and configured to prevent air from flowing from the second air chamber S12 to the first air chamber S11. The second check valve 108 is configured to allow air to flow from the second air chamber S12 to the first air chamber S11 and configured to prevent air from flowing from the first air chamber S11 to the second air chamber S12.

The upper sealing structure 47 further includes a first passage 110, a second passage 112, an inner seal ring 114, and an outer seal ring 116. The first passage 110 connects an inlet of the first check valve 106 to an upper cylindrical passage 118 defined between the axially movable member 60 and support member 64. The second passage 112 connects an outlet of the second check valve 108 to a lower cylindrical passage 120 defined between the axially movable member 60 and support member 64. The second passage 112 is provided on a lower side of the first passage 110 in the axial direction D. The inner seal ring 114 is provided between the first passage 110 and the second passage 112 in the axial direction D. The upper cylindrical passage 118 and the lower cylindrical passage 120 are sealed therebetween with the inner seal ring 114.

The connecting part 88 of the axially movable member 60 includes a third passage 122. The third passage 122 is configured to connect an inside space of the connecting part 88 to one of the upper cylindrical passage 118 and the lower cylindrical passage 120.

As seen in FIG. 7, the third passage 122 is disposed on a lower side of the inner seal ring 114 in the axial direction D in a state where the axially movable member 60 is positioned at the long-stroke position P1. This positional relationship between the third passage 122 and the inner seal ring 114 allows the inside passage S14 of the connecting part 88 to be in fluid communication with the outlet of the second check valve 108 via the second passage 112, the lower cylindrical passage 120 and the third passage 122.

As seen in FIG. 8, the third passage 122 is disposed on an upper side of the inner seal ring 114 in the axial direction D in a state where the axially movable member 60 is positioned at the short-stroke position P2. This positional relationship between the third passage 122 and the inner seal ring 114 allows the inside passage S14 of the connecting part 88 to be in fluid communication with the inlet of the first check valve 106 via the third passage 122, the upper cylindrical passage 118 and the first passage 110. The inside passage S14 of the connecting part 88 can serves as a positive air chamber of the bicycle suspension 12.

Figure 9:
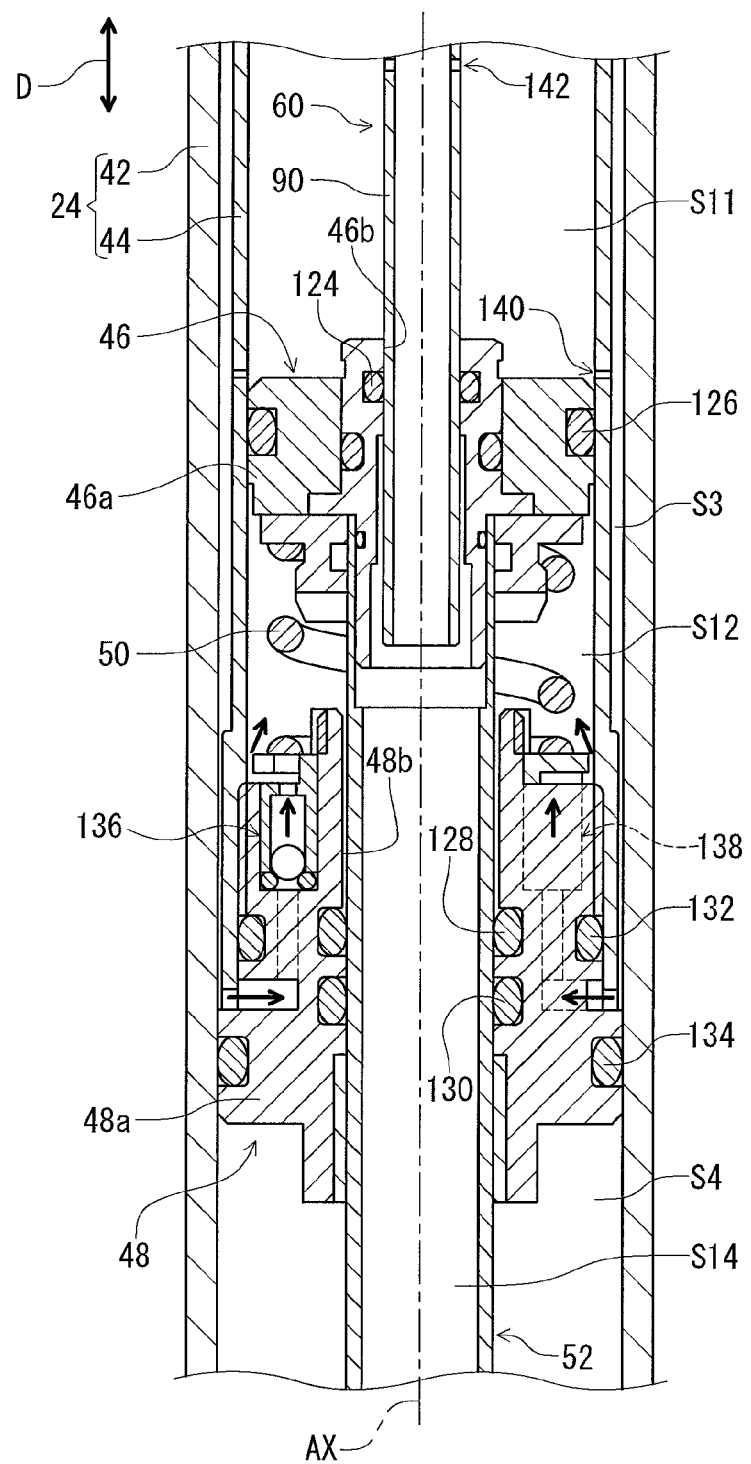
FIG. 9 is a partial cross-sectional view of the bicycle suspension illustrated in FIG. 1 (long-stroke position)

As seen in FIG. 9, the upper tube part 90 of the axially movable member 60 is relatively slidable with respect to the piston 46 in the axial direction D. The piston 46 is relatively slidable with respect to the first upper cylinder 24 (the inner tube member 44) in the axial direction D. The piston 46 includes a piston main-body 46a having a through-hole 46b through which the upper tube part 90 extends. The piston 46 further includes an inner seal ring 124 and an outer seal ring 126. The inner seal ring 124 is provided in an inner peripheral surface of the through-hole 46b. The outer seal ring 126 is provided in an outer peripheral surface of the piston main-body 46a. The first air chamber S11 is sealed from the second air chamber S12 by the inner seal ring 124 and the outer seal ring 126.

The lower tube part 52 is secured to the piston 46. The lower tube part 52 is relatively slidable with respect to the lower sealing structure 48 in the axial direction D. The lower sealing structure 48 includes a sealing main-body 48a having a through-hole 48b through which the lower tube part 52 extends. The lower sealing structure 48 further includes a first inner seal ring 128, a second inner seal ring 130, a first outer seal ring 132, and a second outer seal ring 134. The first inner seal ring 128 and the second inner seal ring 130 are provided in an inner peripheral surface of the through-hole 48b. The first outer seal ring 132 and the second outer seal ring 134 are provided in an outer peripheral surface of the sealing main-body 48a. The second air chamber S12 and a lower chamber S4 are sealed therebetween with the first inner seal ring 128 and the second inner seal ring 130. The lower chamber S4 is defined by the lower sealing structure 48 and the outer tube member 42. The second air chamber S12 and the intermediate passage S3 are sealed therebetween with the first outer seal ring 132. The intermediate passage S3 and the lower chamber S4 are sealed therebetween with the second outer seal ring 134.

The lower sealing structure 48 includes a third check valve 136 and a fourth check valve 138. Each of the third check valve 136 and the fourth check valve 138 is configured to allow air to flow from the intermediate passage S3 to the second air chamber S12 and configured to prevent air from flowing from the second air chamber S12 to the intermediate passage S3.

As seen in FIG. 9, the inner tube member 44 includes a first communication passage 140 configured to connect the intermediate passage S3 to one of the first air chamber S11 and the second air chamber S12. In the long-stroke state of the bicycle suspension 12, the first communication passage 140 is located above the outer seal ring 126 in the axial direction D to connect the intermediate passage S3 to the first air chamber S11. In the short-stroke state of the bicycle suspension 12, the first communication passage 140 is located below the outer seal ring 126 in the axial direction D to connect the intermediate passage S3 to the second air chamber S12.

The upper tube part 90 includes a second communication passage 142 configured to connect the inside passage S14 of the upper tube part 90 to one of the first air chamber S11 and the second air chamber S12. In the long-stroke state of the bicycle suspension 12, the axially movable member 60 is located at the long-stroke position P1 (FIG. 4), and the second communication passage 142 is located above the inner seal ring 124 in the axial direction D to connect the inside passage S14 of the upper tube part 90 to the first air chamber S11. In the short-stroke state of the bicycle suspension 12, the axially movable member 60 is located at the short-stroke position P2 (FIG. 4), and the second communication passage 142 is located below the inner seal ring 124 in the axial direction D to connect the inside passage S14 of the upper tube part 90 to the second air chamber S12.

Figure 10:
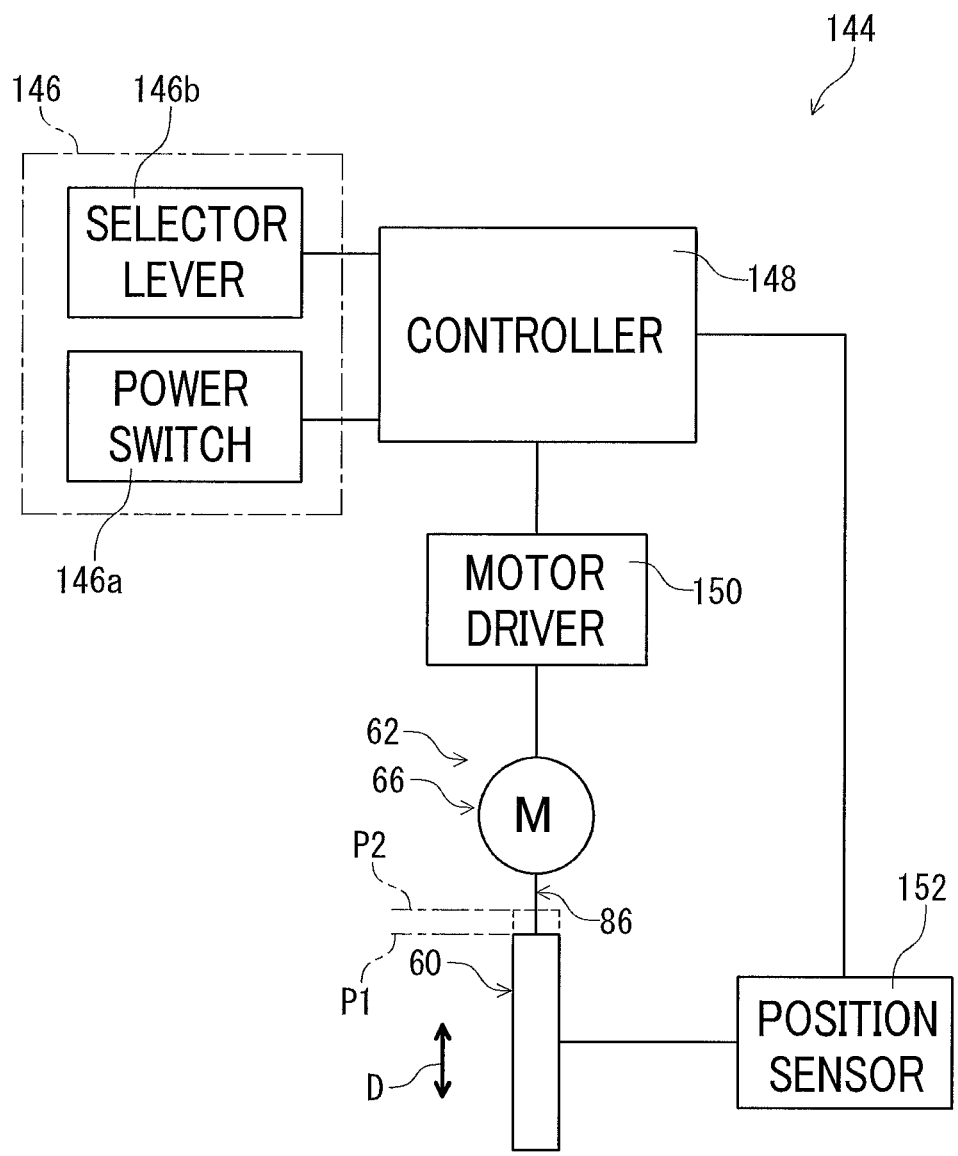
FIG. 10 is a block diagram of an electric control system of the bicycle suspension illustrated in FIG. 1.

Referring to FIG. 10, the bicycle suspension 12 includes an electric control system 144 configured to switch a state of the bicycle suspension 12 between the long-stroke state and the short-stroke state of the bicycle suspension 12. More specifically, the electric control system 144 is configured to control the actuator 62 of the stroke adjustment structure 54 to move the axially movable member 60 between the long-stroke position P1 and the short-stroke position P2.

The electric control system 144 includes a switch 146, a controller 148, a motor driver 150, and a position sensor 152. The switch 146 is mounted on the handlebar and includes a power switch 146a and a selector lever 146b. The power switch 146a is configured to allow a rider to turn on or off the electric control system 144 and the actuator 62. The selector lever 146b is further configured to allow the rider to select one of the long-stroke state and the short-stroke state of the bicycle suspension 12. The controller 148 is configured to output commands corresponding to the long-stroke state and the short-stroke state based on an output from the selector lever 146b. The motor driver 150 is configured to generate driving pulses based on the commands output from the controller 148 to operate the actuator 62. The actuator 62 is configured to rotate the output portion 86 in accordance with the driving pulses to move the axially movable member 60 in the axial direction D. The position sensor 152 is configured to detect whether the axially movable member 60 is located at the long-stroke position P1 or the short-stroke position P2. The controller 148 is configured to output commands to stop the actuator 62 based on a detection result from the position sensor 152.

As seen in FIG. 2, a battery 154 is mounted in the handlebar 16 and is configured to supply power to the electric control system 144. The switch 146 is mounted on the handlebar 16. The controller 148 and the motor driver 150 are attached to the head tube 14a. The position sensor 152 is mounted in the first upper cylinder 24.

As seen in FIGS. 5 and 6, the position sensor 152 is provided in the guide portion 92 of the support member 64. The position sensor 152 is configured to detect positions of a detection plate 156 mounted on the connecting part 88 of the axially movable member 60. The detection plate 156 includes a first detection target and a second detection target which respectively correspond to the long-stroke position P1 and the short-stroke position P2. The position sensor 152 is configured to detect the first detection target and the second detection target on the axially movable member 60.

Figure 11:
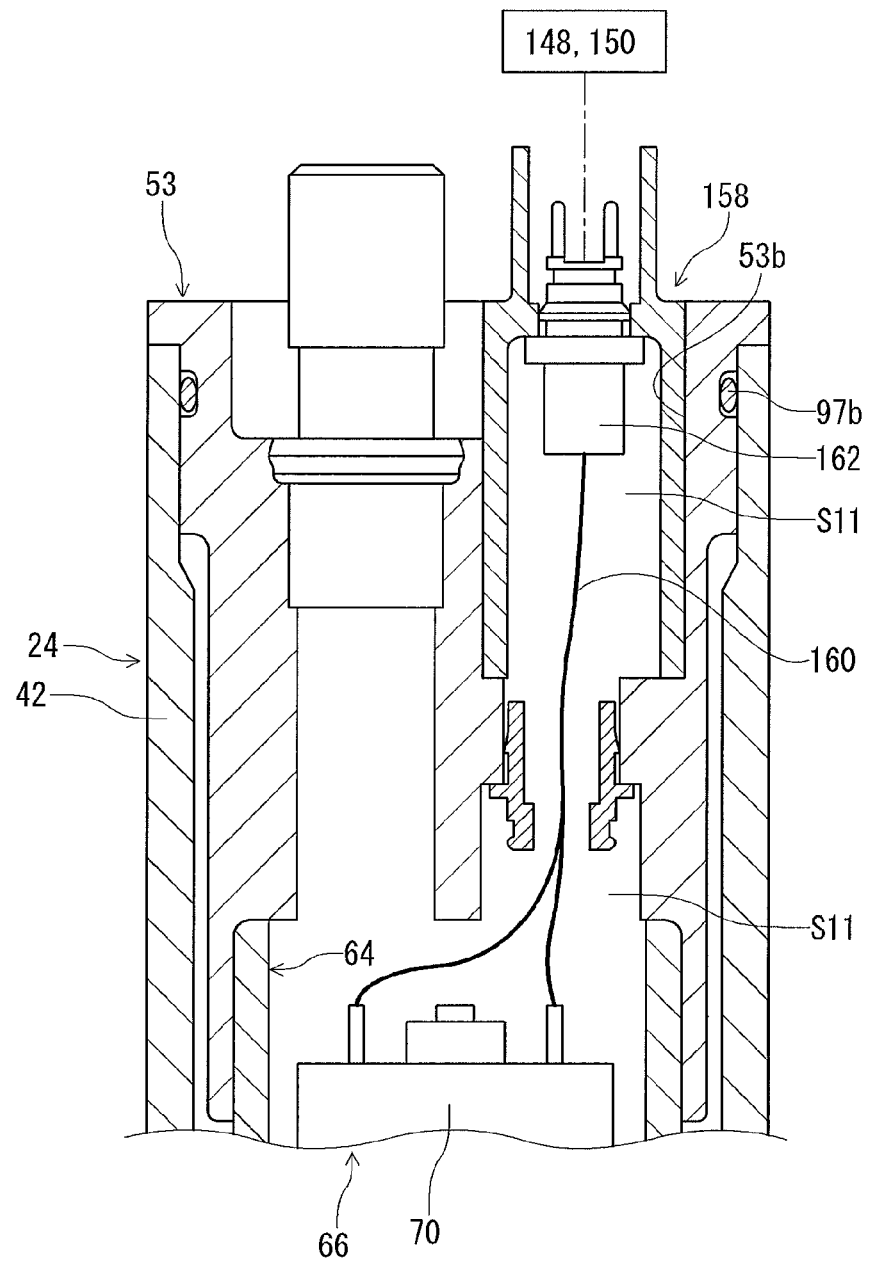
FIG. 11 a partial cross-sectional view of the bicycle suspension illustrated in FIG. 1.

As seen in FIG. 11, the bicycle suspension 12 further includes an electrical connection unit 158 attached to the cover member 53. The electrical connection unit 158 is attached to an attachment opening 53b of the cover member 53. The electrical connection unit 158 has a sealing structure such that the first air chamber S11 is sealed from an outside of the first shock absorber 34. The motor 66 is electrically connected to the electrical connection unit 158 via an electrical wire 160 and an electrical connector 162. The electrical wire 160 is connected to terminals of the motor 66. The electrical connector 162 is configured to be connected to the electrical connection unit 158. The electrical connection unit 158 is connected to the controller 148 and the motor driver 150 via electrical wires.

Figure 12:
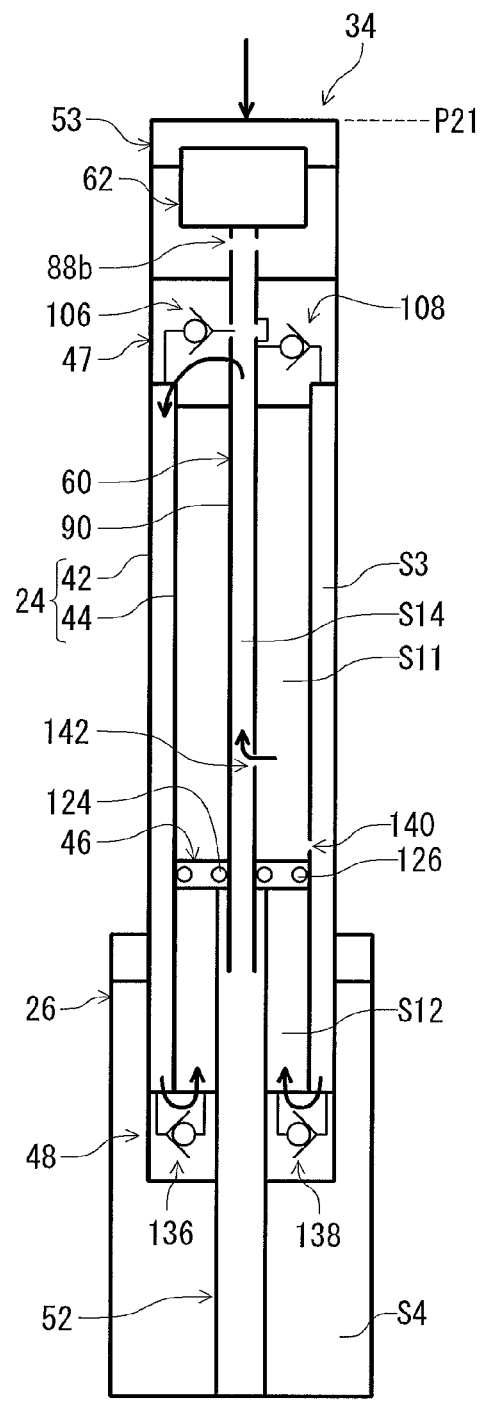
FIG. 12 is a schematic diagram of a first shock absorber of the bicycle suspension illustrated in FIG. 1 (long-stroke state)

Referring to FIGS. 12 to 15, the operations of the bicycle suspension 12 will be described in detail. As seen in FIG. 12, the first upper cylinder 24 is located at a long-stroke position P21 relative to the first lower cylinder 26 in the long-stroke state of the bicycle suspension 12. When the rider selects the short-stroke state using the selector lever 146b of the switch 146 in the long-stroke state, the axially movable member 60 is moved by the actuator 62 from the long-stroke position P1 to the short-stroke position P2. As a result, the first air chamber S11 is in fluid communication with the intermediate passage S3 via the second communication passage 142, the inside passage S14 of the upper tube part 90 and the first check valve 106. The intermediate passage S3 is in fluid communication with the third check valve 136 and the fourth check valve 138. When the rider downward presses the first upper cylinder 24, air flows from the first air chamber S11 to the second air chamber S12 via the inside passage S14 and the intermediate passage S3, causing the first upper cylinder 24 to downward move relative to the first lower cylinder 26.

Figure 13:
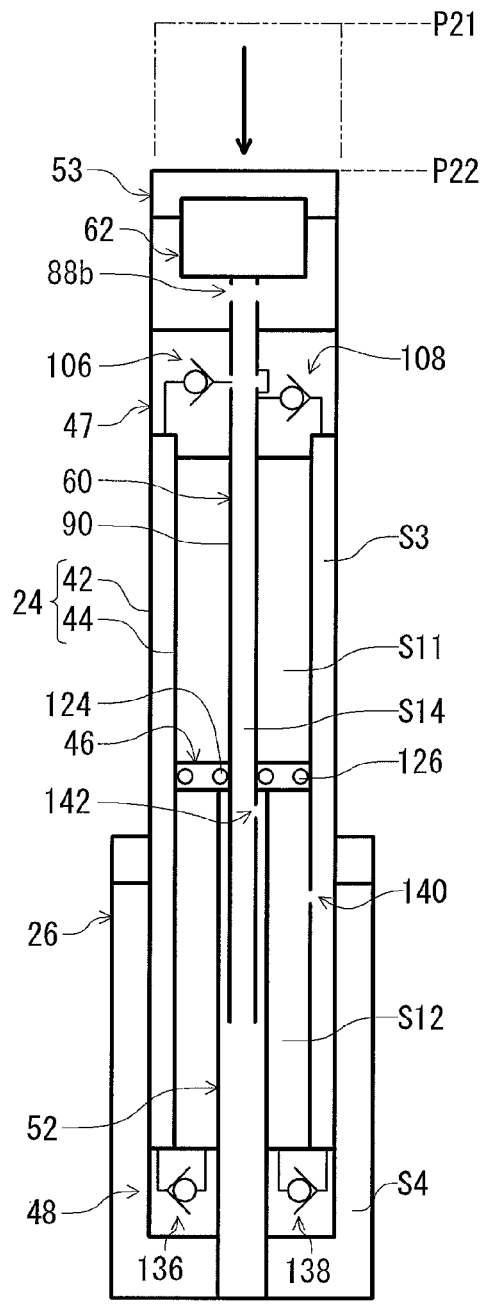
FIG. 13 is a schematic diagram of the first shock absorber of the bicycle suspension illustrated in FIG. 1 (short-stroke state)

As seen in FIG. 13, when the second communication passage 142 downward passes through the inner seal ring 124 provided in the piston 46, air is prevented from flowing from the first air chamber S11 to the second air chamber S12 via the inside passage S14 and the intermediate passage S3. This causes the first upper cylinder 24 to stop at a short-stroke position P22 relative to the first lower cylinder 26. Accordingly, an initial total length of the bicycle suspension 12 can be decreased.

Figure 14:
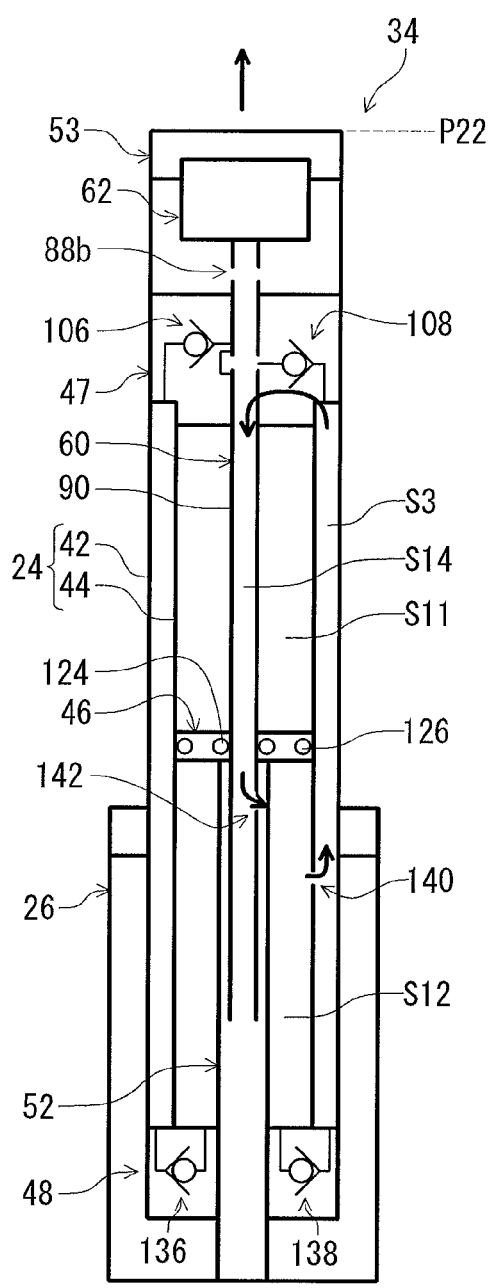
FIG. 14 is a schematic diagram of the first shock absorber of the bicycle suspension illustrated in FIG. 1 (short-stroke state)

As seen in FIG. 14, when the rider selects the long-stroke state using the selector lever 146b of the switch 146 in the short-stroke state of the bicycle suspension 12, the axially movable member 60 is moved by the actuator 62 from the long-stroke position P1 to the short-stroke position P2. As a result, the second air chamber S12 is in fluid communication with the inside passage S14 of the upper tube part 90 and the lower tube part 52 via the first communication passage 140, the intermediate passage S3 and the second check valve 108. In the short-stroke state, a pressure of the second air chamber S12 is higher than a pressure of the second air chamber S12 in the long-stroke state. Accordingly, air naturally flows from the second air chamber S12 to the first air chamber S11 via the intermediate passage S3 and the inside passage S14, causing the first upper cylinder 24 to upward move relative to the first lower cylinder 26.

Figure 15:
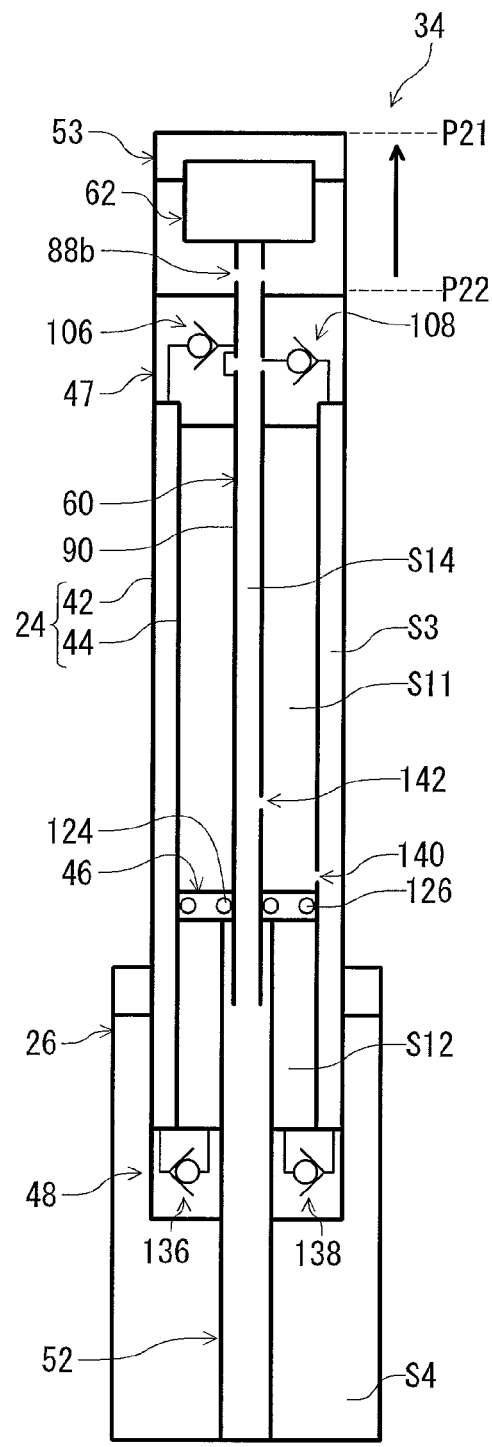
FIG. 15 is a schematic diagram of a first shock absorber of the bicycle suspension illustrated in FIG. 1 (long-stroke state)

As seen in FIG. 15, when the first communication passage 140 upward passes through the outer seal ring 126 of the piston 46, air is prevented from flowing from the second air chamber S12 to the first air chamber S11 via the intermediate passage S3 and the inside passage S14. This causes the first upper cylinder 24 to stop at the long-stroke position P21 relative to the first lower cylinder 26. Accordingly, an initial total length of the bicycle suspension 12 can be increased.

With the bicycle suspension 12 in accordance with the first embodiment, since the axially movable member 60 is configured to be entirely disposed in the first air chamber S11, it is likely to cancel an axial force caused by pressure in the first air chamber S11. For example, referring to FIG. 4, pressure is applied to the axially movable member 60 in the first air chamber S11 from an upper side and a lower side. An upwardly axial force F1 is defined as an axial force caused by pressure applied to the axially movable member 60 from the lower side. A downwardly axial force F2 is defined as an axial force caused by pressure applied to the axially movable member 60 from the upper side. Since the axially movable member 60 is configured to be entirely disposed in the first air chamber S11, the downwardly axial force F2 is likely to cancel the upwardly axial force F1. This reduces the total axial force caused by pressure in the first air chamber S11, allowing the driving force applied from the actuator 62 to the axially movable member 60 to be reduced. Accordingly, with the bicycle suspension 12, the actuator 62 can be more compact than an actuator of a comparative bicycle suspension in which a part of an axially movable member is provided outside a positive chamber.

Second Embodiment

A bicycle suspension 212 in accordance with the second embodiment will be described below referring to FIG. 16. The bicycle suspension 212 has the same construction as the bicycle suspension 12 except for an arrangement of the actuator 62. Thus, elements having substantially the same function as those in the first embodiment will be numbered the same here, and will not be described again in detail here for the sake of brevity.

Figure 16:
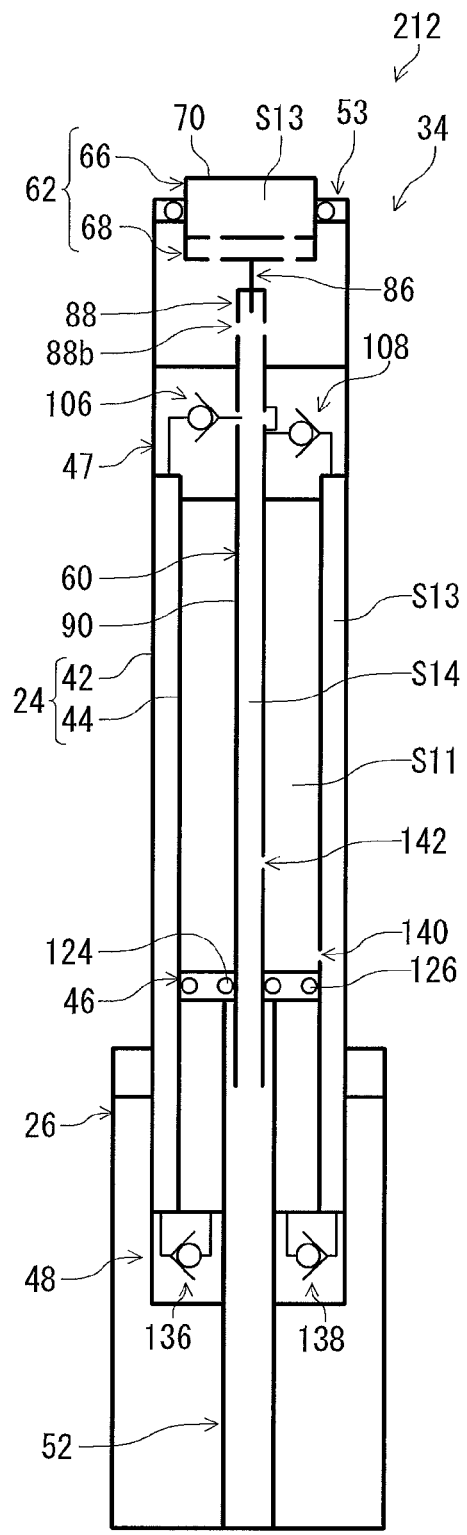
FIG. 16 is a schematic diagram of a part of a bicycle suspension in accordance with a second embodiment.

As seen in FIG. 16, the actuator 62 can be partly disposed in the first air chamber S11. More specifically, the housing 70 of the motor 66 can be partly disposed in the first air chamber S11. An upper portion of the actuator 62 (an upper portion of the housing 70) is disposed outside the first air chamber S11. In the illustrated embodiment, the upper portion of the actuator 62 has a sealing structure to seal the first air chamber S11 with respect to an outside of the bicycle suspension 212. More specifically, the upper portion of the housing 70 has a sealing structure to seal the first air chamber S11 with respect to an outside of the bicycle suspension 212. The inside space S13 of the housing 70 can be in fluid communication with the first air chamber S11.

With the bicycle suspension 212 in accordance with the second embodiment, since the axially movable member 60 is configured to be entirely disposed in the first air chamber S11, the actuator 62 can be more compact than an actuator of the comparative bicycle suspension as well as the bicycle suspension 12 in accordance with the first embodiment.

Third Embodiment

A bicycle suspension 312 in accordance with the third embodiment will be described below referring to FIG. 17. The bicycle suspension 312 has the same construction as the bicycle suspensions 12 and 212 except for an arrangement of the actuator 62. Thus, elements having substantially the same function as those in the above embodiments will be numbered the same here, and will not be described again in detail here for the sake of brevity.

Figure 17:
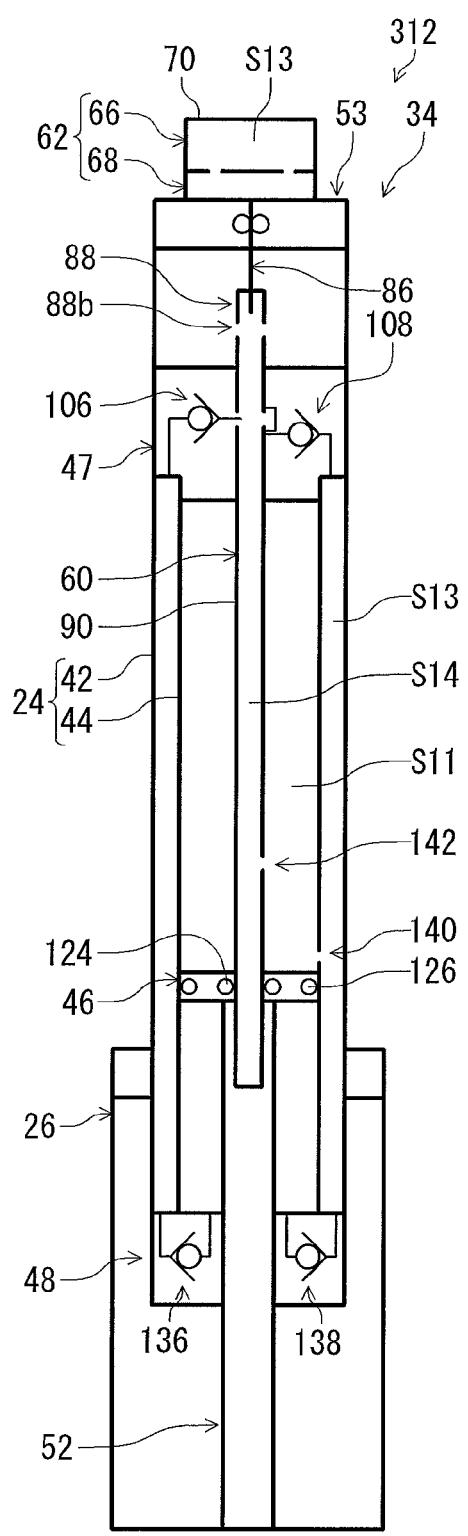
FIG. 17 is a schematic diagram of a part of a bicycle suspension in accordance with a third embodiment.

As seen in FIG. 17, the motor 66 can be disposed outside the first air chamber S11. More specifically, the housing 70 of the motor 66 can be disposed outside the first air chamber S11. The output portion 86 of the transmitting structure 68 extends through the cover member 53. In this embodiment, the actuator 62 can be a manual operating structure without electric components.

With the bicycle suspension 312 in accordance with the third embodiment, since the axially movable member 60 is configured to be entirely disposed in the first air chamber S11, the actuator 62 can be more compact than an actuator of the comparative bicycle suspension as well as the bicycle suspension 12 in accordance with the first embodiment.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" or "element" when used in the singular can have the dual meaning of a single part or a plurality of parts.

The ordinal numbers in the terms "first", "second" or the like recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle suspension comprising:
a cylinder element including an internal space extending in an axial direction of the cylinder element;
a piston element provided in the internal space to define a first air chamber and a second air chamber in the cylinder element, the second air chamber being opposite to the first air chamber with respect to the piston element;
a sealing structure dividing the first air chamber into a first sub chamber and a second sub chamber; and
a stroke adjustment structure configured to adjust a stroke of the bicycle suspension and including an axially movable member configured to initiate a stroke adjustment of the bicycle suspension, the axially movable member being configured to be entirely disposed in the first air chamber, the axially movable member including a passageway to connect the first sub chamber to the second sub chamber, the stroke adjustment structure including an actuator fixedly mounted to the cylinder element, the actuator being configured to move the axially movable member in the axial direction relative to the cylinder element.

2. The bicycle suspension according to claim 1, wherein the actuator includes a housing having an inside space.

3. The bicycle suspension according to claim 2, wherein the housing is configured to be at least partly disposed in the first sub chamber.

4. The bicycle suspension according to claim 2, wherein the inside space of the housing is configured to be in fluid communication with the first air chamber in an airtight state with respect to an outside of the first air chamber and the housing.

5. The bicycle suspension according to claim 2, wherein the housing is configured to be entirely disposed in the first sub chamber.

6. The bicycle suspension according to claim 1, wherein the first air chamber defines a positive air chamber of the bicycle suspension, and
the second air chamber defines a negative air chamber of the bicycle suspension.

7. The bicycle suspension according to claim 2, wherein the inside space of the housing is configured to be in fluid communication with the first air chamber to define a positive air chamber of the bicycle suspension together with the first air chamber.

8. The bicycle suspension according to claim 2, wherein the actuator includes an output portion rotatable with respect to a rotational axis that is parallel to the axial direction,
the axially movable member is connected to the output portion, and
the output portion is configured to be at least partly disposed in the first sub chamber.

9. The bicycle suspension according to claim 8, wherein the output portion is configured to be entirely disposed in the first sub chamber.

10. The bicycle suspension according to claim 2, wherein an outer peripheral surface of the housing is spaced apart from an inner peripheral surface of the cylinder element in a radial direction perpendicular to the axial direction.

11. The bicycle suspension according to claim 2, wherein the actuator comprises a motor.

12. The bicycle suspension according to claim 11, wherein
the motor includes
a stator configured to be secured to the housing and including a coil, and
a rotor configured to be rotatable relative to the stator and including a magnet.

13. The bicycle suspension according to claim 1, wherein the actuator is provided in the first sub chamber.

14. The bicycle suspension according to claim 1, wherein the axially movable member is disposed in the first sub chamber and the second sub chamber.

15. The bicycle suspension according to claim 1, wherein the actuator is configured to move the axially movable member in the axial direction relative to the cylinder element and the sealing structure.

16. A bicycle suspension comprising:
a cylinder element including an internal space extending in an axial direction of the cylinder element;
a piston element provided in the internal space to define a first air chamber and a second air chamber in the cylinder element, the second air chamber being opposite to the first air chamber with respect to the piston element;
a sealing structure dividing the first air chamber into a first sub chamber and a second sub chamber; and
a stroke adjustment structure configured to adjust a stroke of the bicycle suspension and including an axially movable member configured to initiate a stroke adjustment of the bicycle suspension, the axially movable member being configured to be entirely disposed in the first air chamber, the axially movable member including a passageway to connect the first sub chamber to the second sub chamber, wherein the passageway of the axially movable member includes
an inside passage extending in the axial direction inside the axially movable member, and
a first passage to connect the inside passage to the first sub chamber, and
the first passage is provided on an opposite side of the second sub chamber with respect to the sealing structure in the axial direction.

17. The bicycle suspension according to claim 16, wherein
the passageway of the axially movable member includes a second passage to connect the inside passage to the second sub chamber, and
the second passage is provided on an opposite side of the first sub chamber with respect to the sealing structure in the axial direction.

18. A bicycle suspension comprising:
a cylinder element including an internal space extending in an axial direction of the cylinder element;
a piston element provided in the internal space to define a first air chamber and a second air chamber in the cylinder element, the second air chamber being opposite to the first air chamber with respect to the piston element;
a sealing structure dividing the first air chamber into a first sub chamber and a second sub chamber; and
a stroke adjustment structure configured to adjust a stroke of the bicycle suspension and including an axially movable member configured to initiate a stroke adjustment of the bicycle suspension, the axially movable member being configured to be entirely disposed in the first air chamber, the axially movable member including a passageway to connect the first sub chamber to the second sub chamber, wherein
the cylinder element includes an outer tube member and a cover member secured to an end of the outer tube member,
the sealing structure is provided in the outer tube member, and
the first sub chamber is provided between the cover member and the sealing structure in the outer tube member.

19. The bicycle suspension according to claim 18, wherein
the piston element is movably provided in the outer tube member, and
the second sub chamber is provided between the sealing structure and the piston element in the outer tube member.

20. The bicycle suspension according to claim 19, further comprising:
an additional sealing structure provided on an opposite side of the sealing structure with respect to the piston element in the axial direction, wherein
the cylinder element includes an inner tube member provided in the outer tube member,
the inner tube member includes a first end and a second end opposite to the first end in the axial direction,
the sealing structure is secured to the first end,
the additional sealing structure is secured to the second end,
the piston element is movably provided in the inner tube member,
the second sub chamber is defined by the inner tube member, the piston element, and the sealing structure, and
the second air chamber is defined by the inner tube member, the piston element, and the additional sealing structure.

21. The bicycle suspension according to claim 18, wherein
the cylinder element includes a seal ring provided between the outer tube member and the cover member, and
the first sub chamber is defined by the sealing structure, the outer tube member, the cover member, and the seal ring.

22. A bicycle suspension comprising:
a cylinder element including an internal space extending in an axial direction of the cylinder element;
a piston element provided in the internal space to define a first air chamber and a second air chamber in the cylinder element, the second air chamber being opposite to the first air chamber with respect to the piston element;
a sealing structure dividing the first air chamber into a first sub chamber and a second sub chamber; and
a stroke adjustment structure configured to adjust a stroke of the bicycle suspension and including an axially movable member configured to initiate a stroke adjustment of the bicycle suspension, the axially movable member being configured to be entirely disposed in the first air chamber, the axially movable member including a passageway to connect the first sub chamber to the second sub chamber, wherein
the axially movable member is movable relative to the cylinder element between a long-stroke position and a short-stroke position in the axial direction,
the sealing structure includes a first check valve and a second check valve,
the first check valve allows air to flow the first air chamber to the second air chamber through the first check valve and prevents air from flowing from the second air chamber to the first air chamber through the first check valve in a state where the axially movable member is positioned at the short-stroke position, and
the second check valve allows air to flow the second air chamber to the first air chamber through the second check valve and prevents air from flowing from the first air chamber to the second air chamber through the second check valve in a state where the axially movable member is positioned at the long-stroke position.

* * * * *